(12) United States Patent
Gan

(10) Patent No.: US 10,710,900 B2
(45) Date of Patent: Jul. 14, 2020

(54) WATER BAG PRESSURE DETECTION DEVICE, WATER BAG INFLOW CONTROL DEVICE AND WATER BAG TYPE WATER PURIFIER

(71) Applicants: WUHU MIDEA KITCHEN AND BATH APPLIANCES MFG. CO., LTD., Wuhu (CN); MIDEA GROUP CO., LTD., Foshan (CN)

(72) Inventor: Junyan Gan, Wuhu (CN)

(*) Notice: Subject to any disclaimer, the term of this patent is extended or adjusted under 35 U.S.C. 154(b) by 0 days.

(21) Appl. No.: 15/554,425

(22) PCT Filed: Jun. 14, 2017

(86) PCT No.: PCT/CN2017/088312
§ 371 (c)(1),
(2) Date: Aug. 29, 2017

(87) PCT Pub. No.: WO2018/161464
PCT Pub. Date: Sep. 13, 2018

(65) Prior Publication Data
US 2020/0031686 A1    Jan. 30, 2020

(30) Foreign Application Priority Data
Mar. 7, 2017 (CN) .......................... 2017 1 0132239
Mar. 7, 2017 (CN) ...................... 2017 2 0217385 U

(51) Int. Cl.
*C02F 1/00* (2006.01)
*G01L 9/10* (2006.01)
(Continued)

(52) U.S. Cl.
CPC .............. *C02F 1/003* (2013.01); *B01D 35/14* (2013.01); *B01D 35/157* (2013.01); *B65D 33/01* (2013.01);
(Continued)

(58) Field of Classification Search
CPC .................. C02F 1/003; C02F 2209/03; C02F 2201/005; C02F 1/00; C02F 1/008;
(Continued)

(56) References Cited

U.S. PATENT DOCUMENTS 3,589,862 A * 6/1971 Veloz ..................... B01D 61/10
                                                  222/386.5
5,256,279 A * 10/1993 Voznick ............. B01D 17/0214
                                                  210/86
(Continued)

FOREIGN PATENT DOCUMENTS

CN          101898807 A      12/2010
CN          101904689 A      12/2010
(Continued)

*Primary Examiner* — Joseph W Drodge
(74) *Attorney, Agent, or Firm* — Kilpatrick Townsend & Stockton, LLP

(57) ABSTRACT

A water bag pressure detection device, a water bag inflow control device and a water bag type water purifier are provided. The water bag pressure detection device includes: a base seat defining an airtight cavity therein, and having an upper end provided with a mounting opening; a pressure sensor module having at least a lower portion disposed in the airtight cavity and connected with a circumferential edge of the mounting opening in a sealing manner, an inductive head of the pressure sensor module being configured to abut against a lower portion of the water bag; and a ventilation member defining a ventilation passage therein and disposed to the base seat, the ventilation passage being provided with a balancing seal member configured to move in the ventilation passage along with variations of pressure in the airtight cavity and outside pressure.

10 Claims, 2 Drawing Sheets

(51) Int. Cl.
*B01D 35/14* (2006.01)
*B01D 35/157* (2006.01)
*B65D 33/01* (2006.01)
*B67D 3/00* (2006.01)
*G01L 7/18* (2006.01)
*G01L 19/06* (2006.01)

(52) U.S. Cl.
CPC ............ *B67D 3/0074* (2013.01); *G01L 7/182* (2013.01); *G01L 9/10* (2013.01); *G01L 19/06* (2013.01); *C02F 2201/005* (2013.01); *C02F 2209/03* (2013.01)

(58) Field of Classification Search
CPC ... C02F 1/441; G01L 9/10; G01L 9/00; G01L 19/00; G01L 7/00; G01L 7/18; G01L 7/182; G01L 19/06; G01L 19/0618; G01L 19/14; G01G 5/04; G01G 5/00; B01D 29/606; B01D 35/02; B01D 35/027; B01D 35/14; B01D 35/157; B01D 35/1573; B01D 36/04; B01D 61/12; B01D 61/22; B01D 61/32; B65D 1/32; B65D 29/00; B65D 29/04; B65D 33/00; B65D 33/004; B65D 33/01; B65D 37/00; B65D 55/00; B65D 88/16; B65D 88/54; B65D 90/12; B65D 90/48; B67D 3/00; B67D 3/0003; B67D 3/0038; B67D 3/0061; B67D 3/0074; B67D 3/0083; B67D 7/36; B67D 7/76; B67D 7/766; B67D 2210/0005; B67D 2210/0001; B67D 2210/0018; B67D 2210/00028; B67D 2210/00031

USPC ...... 210/90, 257.1, 257.2; 73/700, 723, 751, 73/756; 220/495.01, 495.06, 703, 89.1; 222/52, 64, 65, 92, 94, 105, 106, 189.06; 383/2, 3, 41, 100, 103
See application file for complete search history.

(56) References Cited

U.S. PATENT DOCUMENTS

| | | | |
|---|---|---|---|
| 5,445,729 A * | 8/1995 | Monroe | B01D 61/08 210/109 |
| 6,423,212 B1 * | 7/2002 | Bosko | B01D 61/08 210/108 |
| 2004/0112917 A1 * | 6/2004 | Groesbeck | B67D 1/0021 222/105 |
| 2005/0028550 A1 * | 2/2005 | Crettet, IV | B67D 3/0038 62/391 |
| 2005/0092769 A1 * | 5/2005 | Macler, II | B67B 7/28 222/83 |
| 2007/0154370 A1 | 7/2007 | Mehus et al. | |
| 2008/0277414 A1 * | 11/2008 | Macler | B67D 3/0009 222/85 |
| 2011/0266287 A1 * | 11/2011 | Groesbeck | B65D 5/4204 220/592.01 |
| 2016/0207751 A1 * | 7/2016 | Groesbeck | B67D 3/0067 |
| 2017/0121199 A1 * | 5/2017 | Thorner | C02F 1/688 |

FOREIGN PATENT DOCUMENTS

| | | |
|---|---|---|
| CN | 104215382 A | 12/2014 |
| CN | 104215383 A | 12/2014 |
| CN | 204520130 U | 8/2015 |
| CN | 204918079 U | 12/2015 |

* cited by examiner

WATER BAG PRESSURE DETECTION DEVICE, WATER BAG INFLOW CONTROL DEVICE AND WATER BAG TYPE WATER PURIFIER

CROSS-REFERENCE TO RELATED APPLICATION

This application is a national phase entry under 35 USC § 371 of International Application PCT/CN2017/088312, filed Jun. 14, 2017, which claims priority to and benefits of Chinese Patent Applications Serial No. 201720217385.6 and 201710132239.8, both filed with the State Intellectual Property Office of P. R. China on Mar. 7, 2017, the entire contents of which are incorporated herein by reference.

FIELD

The present disclosure relates to a field of water treatment technology, and more particularly to a water bag pressure detection device, a water bag inflow control device and a water bag type water purifier.

BACKGROUND

A kitchen water purifier has found its way into every family. To solve a problem that water production of the water purifier is little, water outflows slowly, and hence a large amount of water required by family life cannot be satisfied, a water purifier with a water bag function appears. The water purifier with the water bag function, i.e. a water bag type water purifier, is characterized in storing produced water in the water bag. A water capacity of the water bag depends on an overall structure of the machine and a volume of the water bag. The water in the water bag can be used directly when a user intends to use water, and water is produced by a filter cartridge when the water bag is empty. Thus, it is a key technique for the water bag type water purifier to judge whether the water bag is full of the produced water by detecting pressure of the water bag.

However, the water bag type water purifier in the related art is not accurate in terms of detecting the pressure of the water bag, and a case that even if the water bag is full, the water is still produced by the filter cartridge and is filled into the water bag often happens, thereby leading the water bag to break down, or even causing a burst in a serious case. A danger coefficient is high and a potential safety hazard is left to the user.

SUMMARY

Embodiments of the present disclosure seek to solve at least one of the problems existing in the related art to at least some extent. Accordingly, a water bag pressure detection device is provided by the present disclosure, and the water bag pressure detection device may achieve pressure detection of the water bag and the detection is relatively accurate.

A water bag type water purifier having the water bag pressure detection device is further provided by the present disclosure.

A water bag inflow control device having the water bag type water purifier is further provided by the present disclosure. The water bag inflow control device may control a water inflow state of the water bag, and the controllability is good.

A water bag type water purifier having the water bag inflow control device is further provided by the present disclosure.

The water bag pressure detection device according to embodiments of the present disclosure, includes a base seat defining an airtight cavity therein, an upper end of the base seat being provided with a mounting opening communicated with the airtight cavity; a pressure sensor module configured to detect pressure in a water bag, at least a lower portion of the pressure sensor module being disposed in the airtight cavity and being connected with a circumferential edge of the mounting opening in a sealing manner, and an inductive head of the pressure sensor module being configured to abut against a lower portion of the water bag; and a ventilation member defining a ventilation passage therein and disposed to the base seat, the ventilation passage communicating the airtight cavity and the outside, and the ventilation passage being provided with a balancing seal member configured to move in the ventilation passage along with variations of pressure in the airtight cavity and outside pressure.

The water bag pressure detection device according to embodiments of the present disclosure may be less subjected to outside factors, have improved working stability, and achieve detection of the pressure in the water bag. The detected result is closer to an actual result, such that the water bag inflow control device may make a prompt response to judge whether the water bag is full of the water, thereby controlling the water inflow to the water bag more precisely. An error rate is almost zero, a risk that the water bag bursts is reduced, and safety is improved. The safety of the whole machine is improved greatly and a failure rate is reduced.

According to an embodiment of the present disclosure, the balancing seal member is configured as an oil layer.

In some embodiments of the present disclosure, an upper end surface of a module body of the pressure sensor module is flush with an upper edge of the mounting opening, and the inductive head is disposed to an upper end of the module body and extends upwards along a vertical direction.

Optionally, the ventilation member is configured as a ventilation pipe extending along a vertical direction.

In some specific embodiments of the present disclosure, the upper end of the base seat is provided with a socket communicated with the airtight cavity, and a lower end of the ventilation member is inserted into the socket in a sealing manner.

According to some embodiments of the present disclosure, the base seat and the ventilation member are configured as an integral member.

The water bag type water purifier according to embodiments of the present disclosure includes the water bag pressure detection device according to embodiments of the present disclosure.

The water bag inflow control device according to embodiments of the present disclosure includes: a water inlet valve disposed in a water inlet passage of a water bag; the water bag pressure detection device according to embodiments of the present disclosure; and a control circuit module connected with a pressure sensor module and the water inlet valve, so as to receive pressure information of the water bag detected by the pressure sensor module and control the water inlet valve to open or close according to the pressure information.

In some embodiments of the present disclosure, a reference value is preset in the control circuit module, and the control circuit module is configured to control the water inlet valve to close when a value of the pressure information is no less than the reference value, and control the water inlet valve to open when the value of the pressure information is less than the reference value.

The water bag type water purifier according to embodiments of the present disclosure includes the water bag inflow control device according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
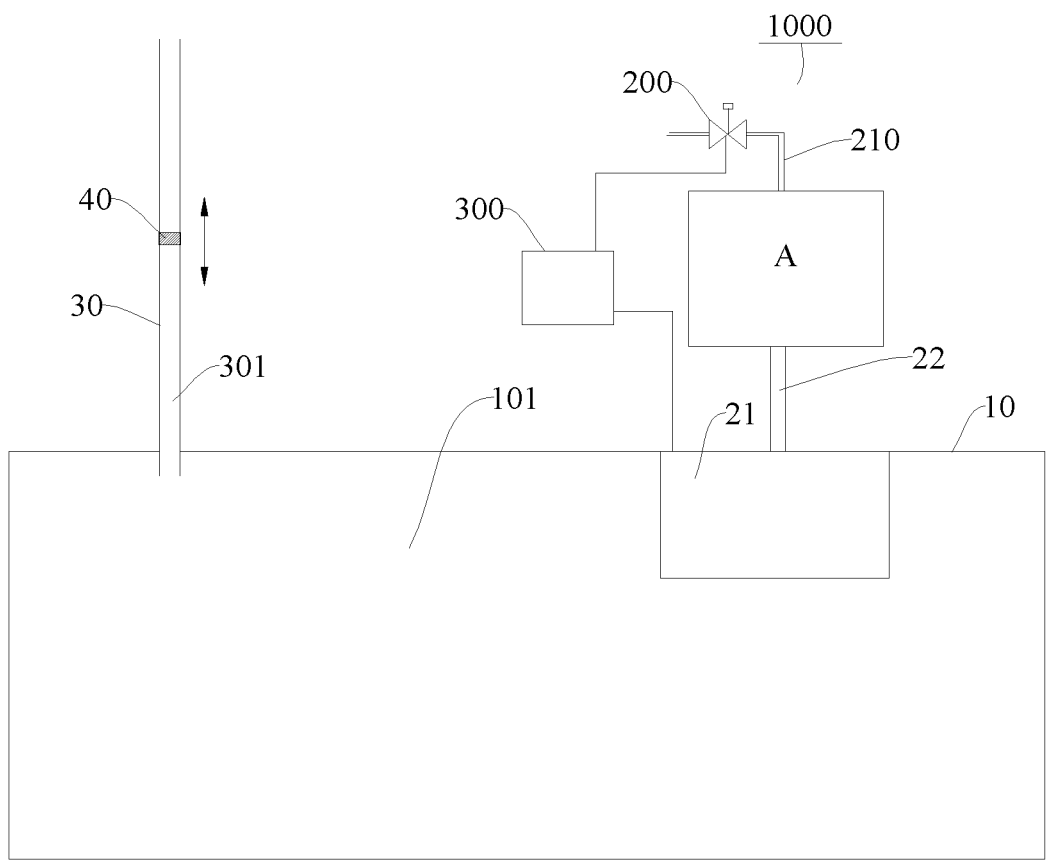
FIG. 1 is schematic view of a water bag inflow control device according to embodiments of the present disclosure.

Water bag inflow control device 1000;
Water bag pressure detection device 100; water inlet valve 200; water inlet passage 210; control circuit module 300;
Base seat 10; airtight cavity 101;
Pressure sensor module 20; module body 21; inductive head 22;
Ventilation member 30; ventilation passage 301;
Balancing seal member 40; water bag A.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. It would be appreciated by those skilled in the art that changes, alternatives, and modifications can be made in the embodiments without departing from spirit, principles and scope of the present disclosure. A protection scope of the present disclosure is defined by claims and their equivalents.

In the specification, it is to be understood that terms such as "upper," "lower," "vertical," "bottom," "inner," and "outer," should be construed to refer to the orientation as then described or as shown in the drawings under discussion. These relative terms are for convenience of description and do not require that the present invention be constructed or operated in a particular orientation.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

A water bag inflow control device 1000 and a water bag pressure detection device 100 according to embodiments of the present disclosure will be described in the following with reference to drawings.

Figure 2:
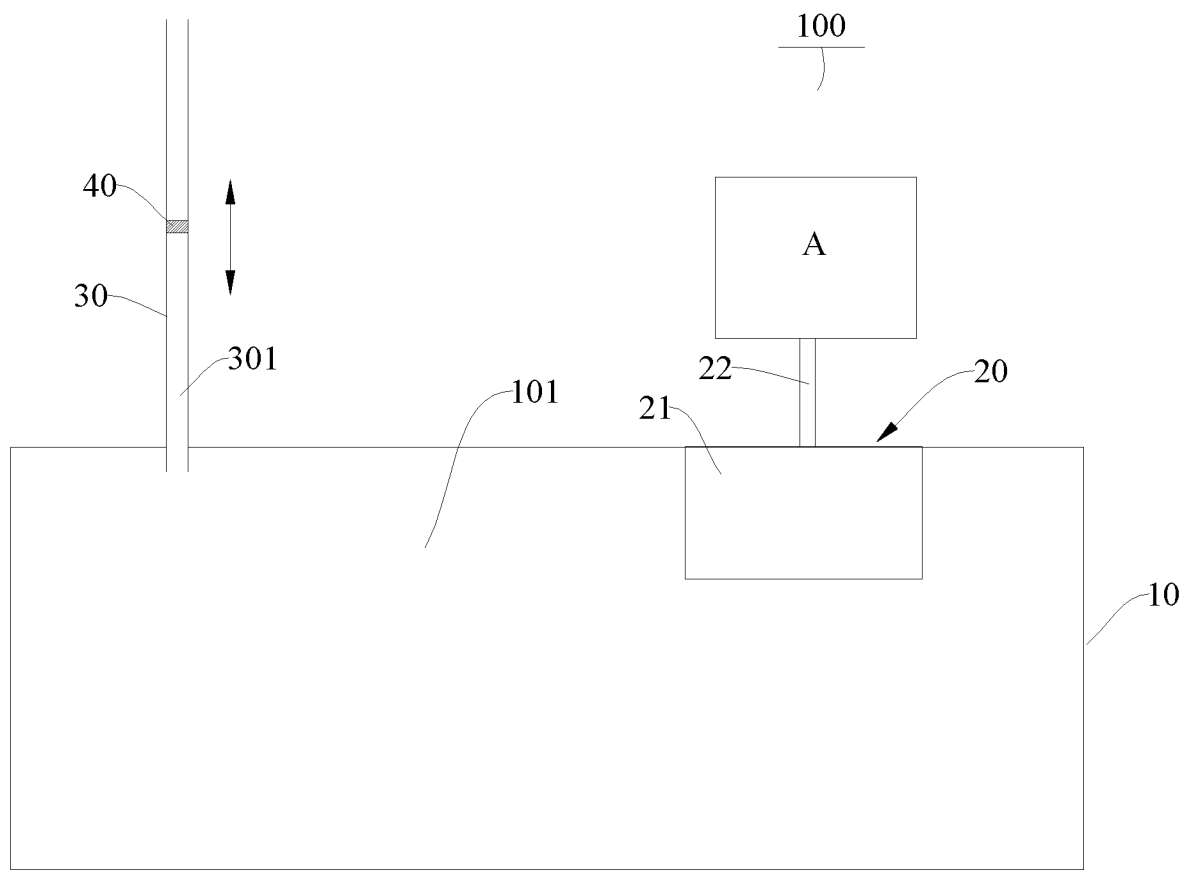
FIG. 2 is a schematic view of a water bag pressure detection device according to embodiments of the present disclosure.

As shown in FIGS. 1 and 2, the water bag inflow control device 1000 according to an embodiment of the present disclosure may include the water bag pressure detection device 100 according to embodiments of the present disclosure, a water inlet valve 200 and a control circuit module 300.

The water bag pressure detection device 100 may detect pressure in a water bag A, and the water bag pressure detection device 100 includes a base seat 10, a pressure sensor module 20 configured to detect the pressure in the water bag, and a ventilation member 30. The pressure sensor module 20 may achieve pressure detection of the water bag. A specific structure of the water bag pressure detection device 100 will be described in detail in the following.

The water inlet valve 200 may be disposed in a water inlet passage 210 of the water bag A, for example, may be disposed to a water inlet of the water bag A, and may be disposed to a water inlet pipe communicating the water bag A and a water supply device. A specific mounting position may be set according to specific situations. When the water inlet valve 200 is opened, the water may enter the water bag A; when the water inlet valve 200 is closed, the water cannot enter the water bag A.

The control circuit module 300 is connected with the pressure sensor module 20. The control circuit module 300 is connected with the water inlet valve 200. The control circuit module 300 may receive pressure information of the water bag A detected by the pressure sensor module 20 and control the water inlet valve 200 to open or close according to the received pressure information, thereby achieving a control function over the inflow of the water bag.

In some specific embodiments of the present disclosure, a reference value may be preset in the control circuit module 300. When a value of the received pressure information is no less than the reference value, the control circuit module 300 may control the water inlet valve 200 to close, and the control circuit module may control the water inlet valve 200 to open when the value of the pressure information is less than the reference value.

That is, the control circuit module 300 may be in advance provided with the reference value corresponding to the pressure when the water bag A is full of the water. When the value of the pressure information of the water bag A detected by the pressure sensor module 20 is less than the reference value, the control circuit module 300 may control the water inlet valve 200 to be in an open state, such that the water bag A may maintain a water-filling state; when the value of the pressure information of the water bag A detected by the pressure sensor module 20 is greater than or equal to the reference value, the control circuit module 300 may control the water inlet valve 200 to be in a closed state, such that the water no longer continues to be filled into the water bag A, thereby preventing the water bag A from busting, and achieving a good control effect.

Herein, it should be noted that, in some embodiments of the present disclosure, the reference value and the value of the pressure information may adopt digital values convenient for the control circuit module 300 to process, in which, the pressure sensor module 20 may transform the detected pressure of the water bag to form a digital value corresponding to the detected pressure, that is, a detected analog value is transformed into a digital value and then is compared with the reference value, which may be appreciated and easy to implement by those skilled in the art, and will not be elaborated herein.

The water bag pressure detection device 100 will be described in the following. As shown in FIG. 2, the water bag pressure detection device 100 according to an embodiment of the present disclosure may include the base seat 10, the pressure sensor module 20 configured to detect pressure in the water bag and the ventilation member 30.

Specifically, the base seat 10 defines an airtight cavity 101 therein, and an upper end of the base seat 10 is provided with a mounting opening communicated with the airtight cavity 101. The pressure sensor module 20 is disposed in the airtight cavity 101 and is connected with a circumferential edge of the mounting opening in a sealing manner. Optionally, according to some embodiments of the present disclosure, a portion of the pressure sensor module 20 extending into the airtight cavity 101 may be disposed according to situations. It is acceptable that only a lower portion of the pressure sensor module 20 extends into the airtight cavity 101, as well as both the lower portion and an upper portion of the pressure sensor module 20 are disposed in the airtight cavity 101. The pressure sensor module 20 includes a module body 21 and an inductive head 22, the inductive head 22 may extend out of the airtight cavity 101 and abut against a lower portion of the water bag A, so as to achieve the detection of the pressure in the water bag.

The ventilation member 30 defines a ventilation passage 301 therein. The ventilation member 30 is disposed to the base seat 10. The ventilation passage 301 communicates the airtight cavity 101 and the outside. The ventilation passage 301 is provided with a balancing seal member 40 configured to move in the ventilation passage 301 along with variations of the pressure in the airtight cavity 101 and of the outside pressure. That is to say, the balancing seal member 40 disposed in the ventilation passage 301 may separate the airtight cavity 101 from the outside, and under the action of the outside pressure and the pressure in the airtight cavity 101, the balancing seal member 40 is similar to a floating plug and may move to a certain position in the ventilation passage 301, so as to achieve force balance and keep stationary. When the outside pressure and/or the pressure in the airtight cavity 101 change(s), the position of the balancing seal member 40 may change correspondingly.

In the water bag type water purifier of the related art, detection about whether the water bag is full of water is achieved by a micro switch. Specifically, when the water bag is full of the water, the water bag expands and extrudes the micro switch, such that the micro switch is switched on, and the filter cartridge stops producing the water and stops supplying the water to the water bag; when the water bag is empty, the water bag shrinks and no longer extrudes the micro switch, such that the micro switch is switched off, and the filter cartridge may continue to produce the water and supply the water to the water bag.

The applicant finds that, in the above structure, since the micro switch is disposed to an upper portion of the water bag and the upper portion of the water bag may generate a relatively apparent displacement along with a variation of water amount in the water bag, the displacement will often change, i.e. deformation of the water bag will change, such that the water bag may not abut against the micro switch accurately in some cases of deformation, thus resulting in that the micro switch may not be switched off when the water bag is full of the water, and the water supply for the water bag will continue, thereby resulting in that the water bag bursts due to over-filling of the water.

To this end, inventors of the present disclosure provides the water bag pressure detection device 100 having a new structure, which will not use the micro switch to detect, but instead use the pressure sensor module 20 capable of detecting the pressure to detect. Moreover, the inductive head 22 of the pressure sensor module 20 abuts against the lower portion of the water bag A. The lower portion of the water bag A may have smaller deformation than the upper portion of the water bag A and may have more steady deformation, and the inductive head 22 may abut against the water bag A more steadily, thereby achieving the detection of the pressure of the water bag. The detection effect is more accurate than that in the related art, which may enable the water bag inflow control device 100 to control the water inflow state of the water bag more accurately, and improve the safety.

In practical use, the inventors of the present disclosure further find that, in some cases, a relatively large difference exists between the pressure of the water bag detected by using the pressure sensor module 20 and the actual value. The inventors make a research on this and creatively find that, the detected result of the pressure sensor module 20 will be influenced by humidity of the surrounding thereof, and especially, to achieve the detected result closer to the actual value, a damp-proof treatment needs to be made on the bottom of the pressure sensor module 20, otherwise the detected result is not the actual pressure value.

Besides that, since the water bag A contains air therein, pressure generated by the air will influence the detection. In order to counteract the pressure and achieve the accurate detection, upon the detection, the pressure sensor module 20 needs to be in communication with the outside air, to achieve a balance of inside pressure and outside pressure, or else the detected value is not the actual pressure value. Therefore, if a general treating method of applying a damp-proof layer to a surface of the pressure sensor module 20 is employed, the damp-proof layer further needs to have some special characteristics such as vent ability, adhesiveness and the like. The damp-proof layer is demanding are high and needs to be specialized, the cost is high, and the manufacturing is not easy.

The inventors of the present disclosure abandon the design thought of the damp-proof layer in the related art, and design the water bag pressure detection device 100 with the airtight cavity 101. At least the lower portion of the pressure sensor module 20 is disposed in the airtight cavity 101 and the balancing seal member 40 configured to move along with the variations of the pressure in the airtight cavity 101 and the outside pressure is provided, so as to achieve the balance of the inside pressure and the outside pressure, such that the lower portion of the pressure sensor module 20 may not only be sealed to be damp-proof, but also reach the effect that the inside pressure and the outside pressure are balanced. Thus, the detected result of the pressure sensor module 20 may be closer to the actual pressure condition when the water bag A is full of the water, and detection accuracy may be improved greatly.

For the water bag pressure detection device 100 according to embodiments of the present disclosure, by disposing the base seat 10 with the airtight cavity and the ventilation member 30 with the balancing seal member 40, and by disposing the pressure sensor module 20 in the airtight cavity 101 and making the inductive head 22 abut against the lower portion of the water bag A, the water bag pressure detection device 100 may be less subjected to outside factors, and there is no need to worry that the detected pressure value is not correct due to a humid environment in the whole machine. The working stability is improved, and the detection is precise. The accurate detection of the pressure in the water bag is achieved and the detected result is closer to the actual result, such that the water bag inflow control device 1000 may make a prompt response to judge whether the water bag A is full of the water, thereby controlling the water inflow to the water bag A more precisely. An error rate is almost zero, a risk that the water bag bursts is reduced, and the safety is improved. The safety of the whole machine is improved greatly and a failure rate is reduced.

In the present disclosure, the balancing seal member 40 is not limited specially, as long as it can satisfy the requirement that the balancing seal member 40 has a sealing effect in the ventilation passage 301 and is configured to move along with the variations of the inside pressure and the outside pressure. Optionally, in some embodiments of the present disclosure, the balancing seal member 40 is configured as an oil layer. Specifically, the applicant is inspired from a structure of a ballpoint pen refill, and applies a theory of the ballpoint pen refill of a different technical field in the present application. The pressure sensor module 20 is located in the airtight cavity 101, and the ventilation passage 301 is communicated with the airtight cavity 101. The oil layer is provided in the ventilation passage 301, to achieve an oil seal. The oil layer may float up and down smoothly in the ventilation passage 301 along with the variations of the inside pressure and the outside pressure, such that the pressure sensor module 20 may detect the actual pressure when the water bag A is full of the water.

The oil layer has a self-lubricating effect and a good ability to be fitted closely with an inner wall of the ventilation passage 301, such that not only the sealing effect is good, but also the up and down movement is smooth, thereby improving sensitivity of the detection and further improving the defection effect.

As shown in FIG. 2, according to an embodiment of the present disclosure, an upper end surface of the module body 21 of the pressure sensor module 20 may be flush with an upper edge of the mounting opening, and the inductive head 22 may be disposed to an upper end of the module body 21 and extend upwards along a vertical direction. Thus, not only a better sealing effect may be achieved along with an aesthetic appearance, but also an effect of stress on the inductive head 22 is better, thereby further improving the accuracy of the detection.

The ventilation member 30 will be further described in the following. In the present disclosure, the ventilation member 30 may be configured as a variety of structures. Optionally, as shown in FIG. 2, in some embodiments of the present disclosure, the ventilation member 30 may be configured as a ventilation pipe extending along the vertical direction. Thus, the ventilation passage 301 extending along the vertical direction may be defined in the ventilation pipe, such that cooperation with the balancing seal member 40 is better, the structural design is more reasonable, the detection sensitivity is higher and the manufacturing is easier.

Optionally, the upper end of the base seat 10 may be provided with a socket communicated with the airtight cavity 101, and a lower end of the ventilation member 30 may be inserted into the socket in a sealing manner, as shown in FIG. 2. Thus, the manufacturing is more convenient, and connection between the ventilation member 30 and the base seat 10 is steady and firm. The connection manner between the ventilation member 30 and the base seat 10 is not limited specially, which could adopt a manner such as welding, adhering and the like. Optionally, in a specific embodiment of the present disclosure, the base seat 10 and the ventilation member 30 can be an integral member. Thus, the base seat 10 and the ventilation member 30 are formed as a whole, the structural stability and strength are higher, and the manufacturing is more convenient.

Figure 3:
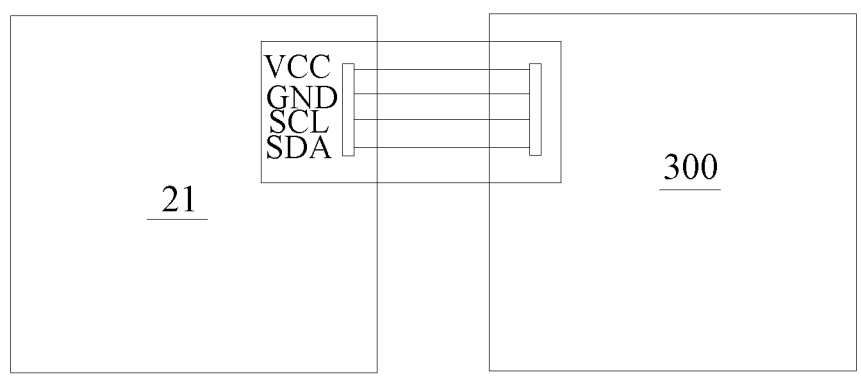
FIG. 3 is a diagram showing connection between a control circuit module and a module body of a water bag inflow control device according to embodiments of the present disclosure.

As shown in FIG. 3, the module body 21 of the pressure sensor module 20 may be provided with a communication interface and a power interface configured to be connected with a signal line and a power wire of the control circuit module 300 respectively. Thus, easy connection between the pressure sensor module 20 and the control circuit module 300 may be achieved, the connection is reliable and signal transmission is good. The pressure sensor module may be supplied with power by the control circuit module 300 without need to provide a separate power supply unit, and hence the structure is more concise.

During the specific manufacturing, sensing parts and a peripheral circuit may be disposed to a small board to form the module body 21 of the pressure sensor module 20, while the communication interface and the power interface are set apart and configured to communicate with the control circuit module 300 and feed the detected pressure value back to the control circuit module 300, for example, a single chip microcomputer. During the assembly, it is only necessary to connect the control circuit module 300 with the module body 21.

The present disclosure further provides a water bag type water treatment machine, i.e. a water purifier with a water bag. The water bag type water purifier according to embodiments of the present disclosure may include the water bag pressure detection device 100 according to embodiments of the present disclosure or the water bag inflow control device 1000 according to embodiments of the present disclosure. Since the water bag pressure detection device 100 or the water bag inflow control device 1000 has the above beneficial technical effects, the safety of the water bag type water purifier is improved, and the water bag may be avoided from bursting.

Other components and operations of the water bag type water purifier according to embodiments of the present disclosure are known to those skilled in the art, which will not be elaborated herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A water bag pressure detection device comprising:
    a base seat defining an airtight cavity therein, an upper end of the base seat being provided with a mounting opening communicated with the airtight cavity;
    a pressure sensor module configured to detect pressure in a water bag, at least a lower portion of the pressure sensor module being disposed in the airtight cavity and being connected with a circumferential edge of the mounting opening in a sealing manner, and an inductive head of the pressure sensor module being configured to abut against a lower portion of the water bag; and a ventilation member defining a ventilation passage therein and disposed at the base seat, the ventilation passage communicating the airtight cavity to outside of the base seat, and the ventilation passage being provided with a balancing seal member configured to move in the ventilation passage along with variations of pressure in the airtight cavity and outside pressure.

2. The water bag pressure detection device according to claim 1, wherein the balancing seal member is configured as an oil layer.

3. The water bag pressure detection device according to claim 1, wherein an upper end surface of a module body of the pressure sensor module is flush with an upper edge of the mounting opening, and the inductive head is disposed at an upper end of the module body and extends upwards along a vertical direction.

4. The water bag pressure detection device according to claim 1, wherein the ventilation member is configured as a ventilation pipe extending along a vertical direction.

5. The water bag pressure detection device according to claim 1, wherein the upper end of the base seat is provided with a socket communicated with the airtight cavity, and a lower end of the ventilation member is inserted into the socket in a sealing manner.

6. The water bag pressure detection device according to claim 1, wherein the base seat and the ventilation member are configured as an integral member.

7. A water bag type water purifier comprising a water bag pressure detection device according to claim 1.

8. A water bag inflow control device comprising:

a water inlet valve disposed in a water inlet passage of a water bag;

a water bag pressure detection device according to claim 1; and a control circuit module connected with the pressure sensor module and the water inlet valve, so as to receive pressure information of the water bag detected by the pressure sensor module and control the water inlet valve to open or close according to the pressure information.

9. The water bag inflow control device according to claim 8, wherein a reference value is preset in the control circuit module, and the control circuit module is configured to control the water inlet valve to close when a value of the pressure information is no less than the reference value, and control the water inlet valve to open when the value of the pressure information is less than the reference value.

10. A water bag type water purifier comprising a water bag inflow control device according to claim 8.

* * * * *